United States Patent [19]

Druffel et al.

[11] Patent Number: 4,947,297

[45] Date of Patent: Aug. 7, 1990

[54] COMPACT FLUORESCENT LAMP FIXTURE

[75] Inventors: James B. Druffel, Rosendale; P. Peter Abdollahi, Poughkeepsie, both of N.Y.

[73] Assignee: Staff Lighting Corporation, Highland, N.Y.

[21] Appl. No.: 370,983

[22] Filed: Jun. 23, 1989

[51] Int. Cl.⁵ ............................................. F21S 1/02
[52] U.S. Cl. ................................. 362/147; 362/217; 362/364; 362/372
[58] Field of Search .............. 362/362, 364, 372, 285, 362/287, 216, 217, 225, 220, 147, 148, 145, 260, 370, 371

[56] References Cited

U.S. PATENT DOCUMENTS

| | | | |
|---|---|---|---|
| 1,757,346 | 5/1930 | Taussig | 362/285 |
| 2,434,108 | 1/1948 | Hendler | 362/364 |
| 2,816,216 | 12/1957 | Dasher | 362/364 |
| 2,859,333 | 11/1958 | Burliuk et al. | 362/364 |
| 2,998,512 | 8/1961 | Duchene et al. | 362/364 |
| 3,219,812 | 11/1965 | Turner | 362/285 |
| 3,299,263 | 1/1967 | Bjontegard | 362/285 |
| 3,348,035 | 10/1967 | Franklin et al. | 362/285 |
| 3,643,089 | 2/1972 | Marantz | 362/217 |
| 3,778,609 | 12/1973 | Liberman | 362/364 |
| 3,882,307 | 5/1975 | Rambusch et al. | 240/44.2 |
| 4,173,037 | 10/1979 | Henderson, Jr., et al. | 362/287 |
| 4,261,029 | 4/1981 | Mousset | 362/283 |
| 4,293,895 | 10/1981 | Kristofek | 362/147 |
| 4,338,677 | 6/1983 | Druffel | 362/276 |
| 4,472,769 | 9/1984 | Hoke et al. | 362/403 |
| 4,498,126 | 2/1985 | Hernandez | 362/220 |
| 4,520,436 | 5/1985 | McNair et al. | 362/260 |
| 4,635,172 | 1/1987 | Steinke | 362/276 |
| 4,704,664 | 11/1987 | McNair | 362/364 |

Primary Examiner—Stephen F. Husar
Assistant Examiner—D. M. Cox
Attorney, Agent, or Firm—Heslin & Rothenberg

[57] ABSTRACT

A compact fluorescent light fixture comprising an open ended dome reflector with an elongated lamp bulb unit projecting transversely therein and adapted to pivot within the reflector to move an end of the elongated lamp bulb unit towards the open end of the dome reflector for relamping purposes. Releasably securing spring means maintains the lamp bulb unit in an optimum position.

10 Claims, 3 Drawing Sheets

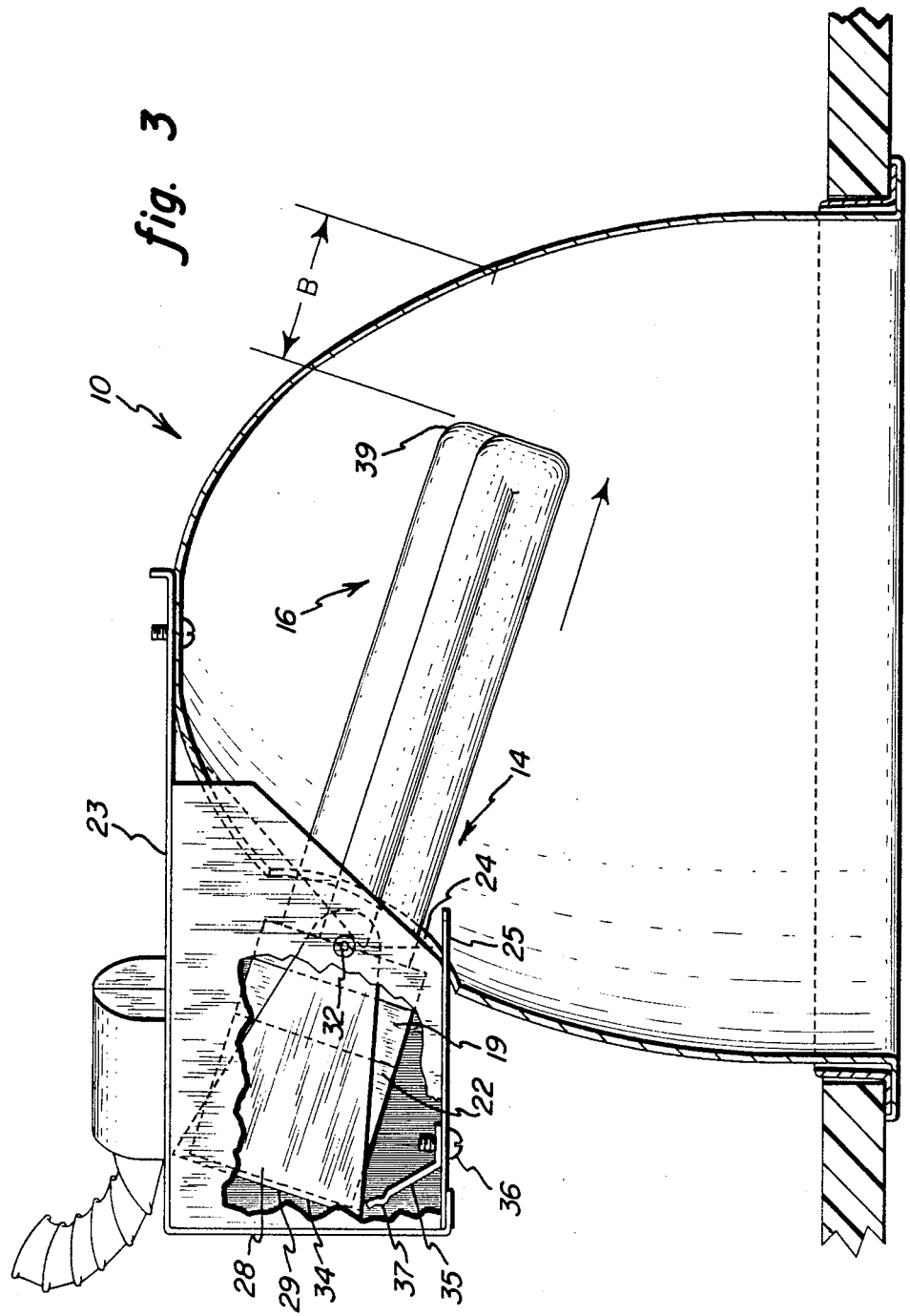

ial lamps, for example, the
COMPACT FLUORESCENT LAMP FIXTURE

BACKGROUND OF THE INVENTION

This invention relates to a compact fluorescent lamp head or fixture, and more particularly to a fluorescent lamp fixture having a domed light reflector with a lamp bulb retained therein by means of a releasably securing and pivoting relamping structure. An elongated lamp bulb unit projects through a side opening transversely into the reflector to a point closely adjacent a generally opposite interior wall portion. In such a fixture it is quite desirable to have the lamp bulb accurately positioned in the dome reflector for optimum light transmission therefrom. When such a fixture is adapted for mounting in a ceiling or wall structure of domestic housing, for example, the dome reflector may occupy a rather large space in order to accomodate a larger lamp bulb, an appropriate lamp bulb base socket therefor, and provision for electrical wiring to be connected to be socket.

Ordinarily, walls and ceilings of domestic housing structures, as well as lighting panels, have a limited depth or thickness dimension to accommodate larger domed reflector fixtures whereas larger domed reflectors faciliate replacement of lamp bulbs, a practice referred to as relamping.

The above and associated relevant problems of limited space have been resolved to some extent by the use of more compact fixtures in which the height of a reflector is reduced by having a lamp bulb which projects into a dome reflector transversely thereto, e.g., along an axis such that the longitudinal axis of the lamp bulb or unit is generally parallel to but spaced from a ceiling or wall in which the lighting fixture may be mounted, or parallel to and spaced from the plane of the open end of the reflector. Such a fixture, or lamp head entails a further problem associated with the need to replace the ordinarily expendable lamp bulbs at periodic intervals.

In a ceiling mounted lighting fixture where an incandescent lamp depends downwardly, a long rod having a lamp bulb grip device at one end is used to reach and engage the lamp bulb for the usual twisting motion to release the lamp bulb, and replacement is accomplished by fitting a new or useable lamp bulb to the engaging device or lamp socket in the fixture. A long rod, grip means as described is not readily adaptable for a transversely mounted lamp bulb as described, and provision is usually made for direct manual replacement from a ladder or appropriate scaffolding. In light fixtures which are portable or multi-directionally adjustable, such as desk, floor, or study lamps, for example, the lamp head is readily accessible or may be adjusted to readily facilitate manual lamp bulb removal and replacement.

As previously described, in many improved and compact designs of light fixtures, larger and longer lamp bulbs are positioned transversely in a domed reflector with the result that the dome configuration imposes a limitation on the useful length of a lamp bulb and the extending end of the lamp bulb lies closely adjacent the interior surface of the reflector. Replacement of most reflector housed transverse lamp bulbs requires a significant movement of the lamp bulb axially along its longitudinal axis to release the lamp bulb from its socket or receptacle connector, and the close proximity of a transverse lamp bulb to the reflector (which is often necessary to obtain maximum light intensity) constitutes a definite hindrance to lamp bulb replacement.

Accordingly in some lighting fixtures, a covered or uncovered aperture is provided in the dome reflector through which relamping is carried out. However, such apertures and covers generate some undesirable interference in the optimum light reflecting characteristics of the reflector. Other solutions to the foregoing problem of relamping a transversely positioned lamp bulb entail the use of a lamp unit which is deeply recessed or mounted in the fixture so that the lamp bulb is effectively released from its socket without the need for an excess axial distance to facilitate manual relamping. Angularly rotatable lamp bulb sockets are also utilized to provide better access to the lamp bulb as well as increased lamp bulb to reflector clearance. Angular rotation mechanisms for lamp sockets have been found to be troublesome because the associated high temperature and temperature fluctuations cause the usual friction stops of the angular motion device to loosen and change the accurate positioning of the lamp bulb in the reflector or grip socket. Also, inadvertent or impulsive rotation of a friction retained socket by grasping and turning the lamp bulb leads to breakage of the lamp bulb at the bulb/base connection. Prior art examples of angularly rotatable lamp units are found in U.S. Pat. Nos. 1,757,345 - Tausig, May, 1930 and 2,816,216 - Dasher, December, 1957.

OBJECTS OF THE INVENTION

It is an object of this invention to provide an improved light fixture having a generally dome shaped reflector therein in which a lamp bulb unit is accurately and fixedly positioned in transverse relationship and adapted to be readily, angularly rotated for manual relamping.

It is a further object of this invention to provide an improved light fixture having a lamp unit transversely positioned in a dome reflector therein and angularly adjustable for relamping purposes, but highly resistant to angular changes during, and caused by, operation of the fixture.

It is a further object of this invention to provide an improved light fixture in which a lamp bulb unit is transversely positioned in a dome reflector in the fixture, and the lamp bulb unit is provided with a releasably securing means releasably securing angular rotation means for relamping purposes. The releasably securing means releasably secures the lamp unit in its original correct reflecting position in the reflector.

SUMMARY OF THE INVENTION

A compact fluorescent lighting fixture includes an open ended generally dome shaped reflector in which a lamp bulb unit is positioned in transverse relationship. A lamp socket assembly is pivotally mounted in the reflector in free swiveling relationship to support the lamp bulb therein and to rotate to provide an appropriate clearance space between the lamp bulb and the dome for manual removal and replacement of the lamp bulb from the open end of the dome. A positive releasably securing latch spring assembly releasably fixes the lamp bulb, in its correct light reflecting relationship in the dome reflector, against loosening forces generated by elevated and fluctuating temperatures as well as vibrational forces to which the pivotal mounting means is subjected.

The above and other objects, features and advantages of this invention will be better understood when taken in connection with the following drawings and their description.

DESCRIPTION OF THE DRAWINGS

FIG. 3 is a cross-section and elevational view of the lamp bulb unit and reflector combination of FIG. 1 shown with the lamp bulb unit pivoted for replacement of the bulb.

DESCRIPTION OF A PREFERRED EMBODIMENT

Figure 1:
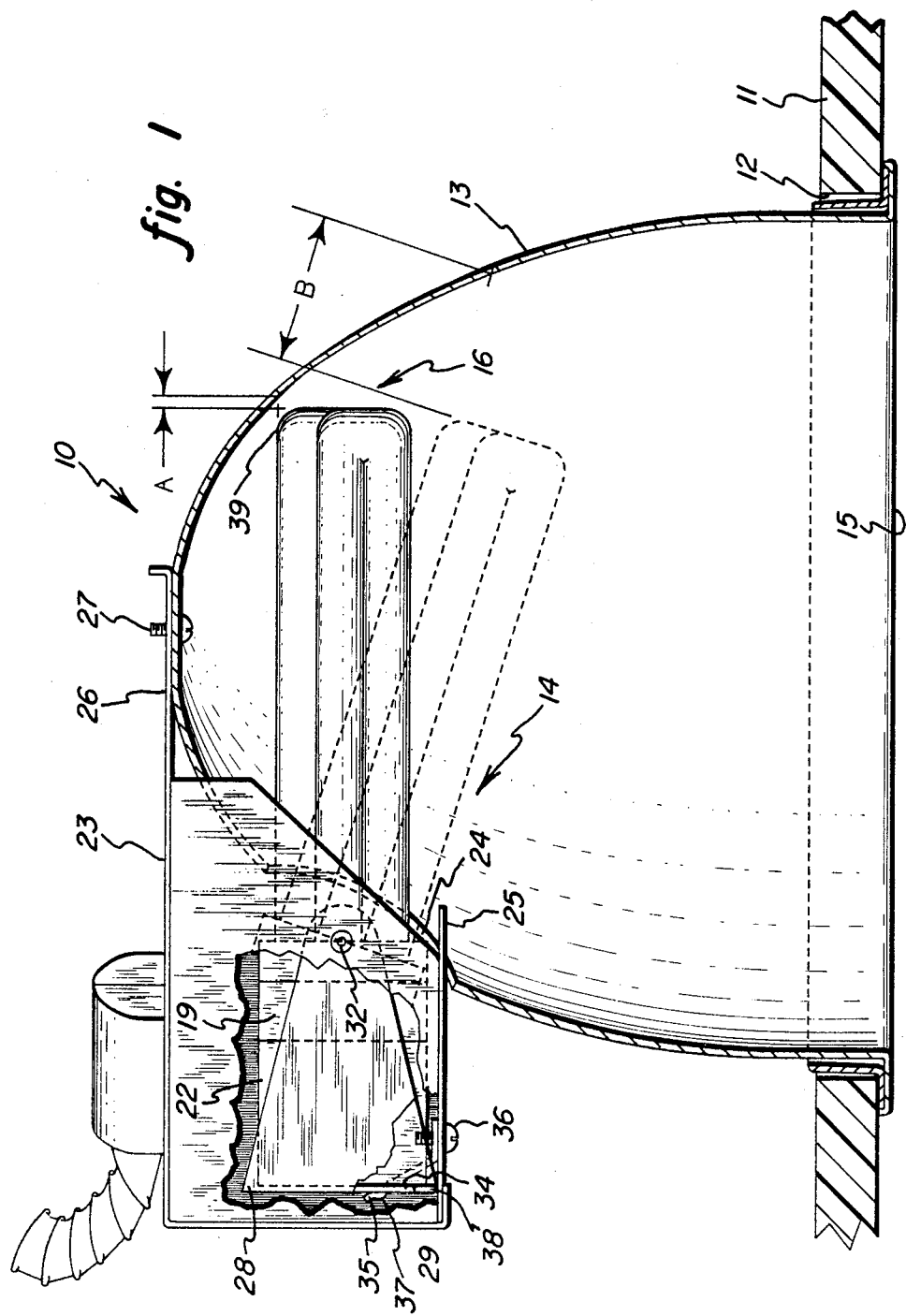
FIG. 1 is a cross-section and elevational view of a lamp bulb unit and reflector combination of a recessed lamp fixture in accordance with this invention in which a dome reflector incorporates an angularly adjustable or rotatable lamp unit therein.

Referring now to FIG. 1, a lighting unit or fixture 10 is positioned, for example, in a room ceiling or wall 11 through an appropriate aperture 12 therein. Fixture 10 includes a generally parabolic or dome light reflector 13. Reflector 13 may comprise a parabolic or hemispherical shape or combinations thereof to provide an appropriate concave reflector structure, generally referred to herein as a dome reflector, with a vertex at a point most remote from the plane of its open end 15. A lamp bulb unit 14, which includes a lamp bulb and lamp socket, is positioned in dome reflector 13 in transverse and spaced relationship thereto to optimize light reflection out of open end 15.

Figure 2:
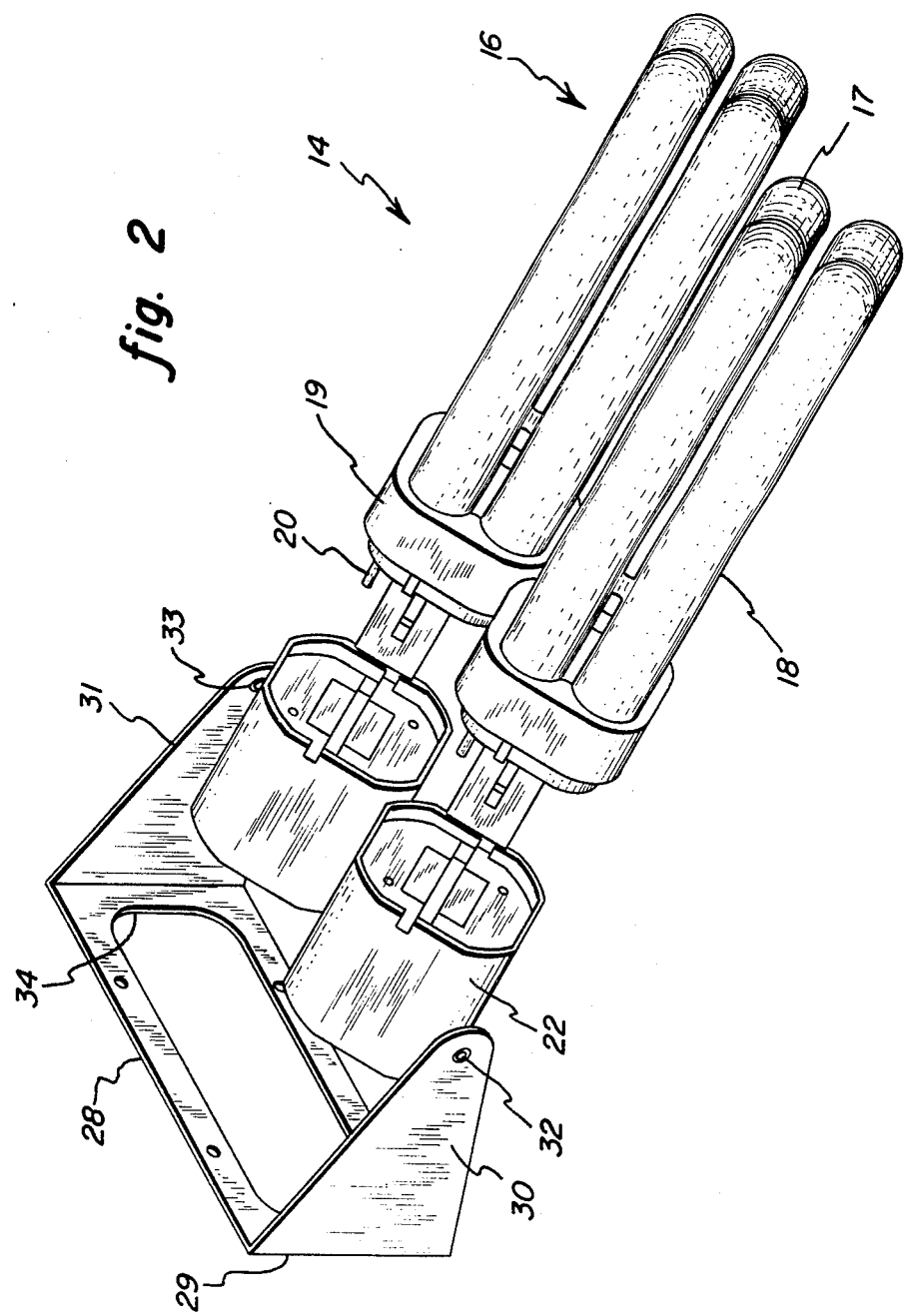
FIG. 2 is an exploded assembly view of a lamp bulb unit, including a receptacle or socket, and a pivoting bracket, which are utilized in the FIG. 1 structure.

As illustrated in FIG. 2, lamp bulb unit 14 (two of which are shown) is a fluorescent or gas discharge lamp bulb as compared to an incandescent filament lamp bulb, and comprises a narrow elongated lamp bulb 16 consisting of a pair of gas filled glass tubes 17 and 18 each formed into a U-shaped configuration with the tube ends fixed in a base 19. Appropriate bayonet type electrical terminals 20 and 21 (not shown) in base 19 are adapted to connect to appropriate electrical bayonet terminals (not shown) in socket 22 to complete the lamp bulb unit 14. Referring again to FIG. 1, in order to mount the lamp bulb unit 14 of FIG. 2 in dome reflector 13 of FIG. 1, a box-like open end, rectangular housing 23 is affixed to dome reflector 13 in transverse relationship therewith and opening into a transverse aperture 24 in dome reflector 13. Transverse aperture 24 is located closer to the vertex of dome reflector 13 than to the plane of opening 15. The open end of rectangular housing 23 is cut away or shaped to fit closely and conformingly with the external curvature of dome reflector 13 against which it abuts. One side of rectangular housing 23 acts as a lip section 25 which passes into aperture 24 and rests on the periphery thereof. An opposite side 26 of rectangular housing 23 projects across the vertex of dome reflector 13 and is attached thereto by an appropriate metal fastener such as a rivet or screw 27.

Lamp bulb unit 14 of FIG. 2 is assembled in housing 23 by means of a receptacle or bracket member 28 which appropriately and fixedly houses socket 22 (see FIG. 2) therein. Bracket member 28 is conveniently a U-shaped member having a base surface 29 and a pair of spaced opposite side arms 30 and 31. Bracket member 28 may be conveniently formed to receive and retain more than one, for example, a pair, of sockets 22 therein in spaced side by side relationship. Bracket member 28 is adapted to pivot in housing 23 by including opposite trunnions or pivot means 32 and 33 which are located one in each of arms 30 and 31 of U-shaped bracket 28 and pivotally mounts bracket 28, together with lamp bulb unit 14 carried thereby, to housing 23. The angular rotation of bracket 28 preferably includes an effectively unrestrained or free swiveling action as distinguished from friction grip restraining means employed primarily to adjust the position of a lamp bulb in a reflector. Such friction devices tend to loosen under operating conditions of the fixture with a result that the lamp bulb in the reflector slowly migrates or creeps from its optimum light reflecting position in the reflector. A free swiveling device requires some means to restrict undesired and/or inadvertent rotation of lamp unit 14.

Accordingly, in the present invention bracket member 28 includes a releasably securing spring latch combination which, with little force, quickly releases bracket 28 for swiveling. As best shown in FIG. 3, the spring latch combination comprises a latch aperture 34 in base surface 29, together with a small wire or strip spring member 35 positioned within housing 23 and attached to a sidewall thereof with a suitable fastener 36. Spring member 35 is formed as an upstanding spring arm terminating in a curve part or crook 37. As illustrated in FIG. 1, upstanding spring arm 35 projects towards base surface 29 so that curve or crook 37 is lightly biased against surface 29, and rotation of bracket 28 causes crook 37 to slide or lightly snap into aperture 34 to positively latch bracket 28 against pivoting and retain lamp bulb 16 in its correct transverse position.

When lamp bulb unit 14 is rotated to its phantom line position of FIG. 1, the initial turning force causes one edge of aperture 34 to bear against and flex the spring 35 so that crook 37 is caused to be easily levered or flexed out of or released from aperture 34 and provide easy rotation of lamp bulb unit 14. However, in the lamp bulb transverse position as shown in solid lines in FIG. 1, crook 37 of spring arm 35 projects into aperture 34 of base surface 29 to provide a light positive latch or lock not only to fixedly retain lamp bulb unit 14 in its correct transverse position, but also to be highly resistant to temperature fluctuation and vibrational forces which tend to weaken friction holding devices and permit slow creeping of lamp bulb unit from its optimum transverse position. The latching arrangement is referred to as releasably securing, requiring no additional or external means to accomplish unlatching other than grasping and turning lamp bulb unit 14. In addition to the foregoing problems associated with friction grip devices, such devices require an additional and precursor step in the relamping sequence, e.g., finding and loosening the device before relamping. Inadvertent rotation of a lamp bulb unit with a tight friction device or a friction device corroded from non use may easily break the glass-to-base seal of the rather weak seals associated with fluorescent glass tubes of gas discharge lighting units. If the friction device is left relatively loose to avoid the foregoing problem the lamp unit becomes highly susceptible to creepage and migration from temperature and vibrational effects which are concurrent with such light fixture operation.

The structure of FIG. 1 as described may also be utilized in various lamp fixture configurations in addition to recessed lighting units, for example, as the lamphead for desk and free standing floor lamps, as well as various portable lamp structures.

In all lamp applications the length of the lamp bulb 16 and the linear distance from the trunnions 32 and 33 to bracket surface 29 are correlated with spring member 35 so that the positive latch provided by crook 37 in aperture 34 is easily overcome before excessive bending forces are imposed on the joint between the glass tube 16 and lamp base 19 when lamp bulb unit 14 is manually rotated to its position in FIG. 3. This position, also shown in phantom in FIG. 1, represents an angle of about 30 degrees from the transverse position of the lamp unit in solid lines of FIG. 1. Angular rotation of about 30 degrees has been found satisfactory and adequate for relamping purposes in the embodiments of the present invention. However, depending upon the application alternate angles of rotation, such as 60 or 90 degrees, may be preferred. For example, a 90 degree angular rotation would allow minimization of the height of fixture 10. The angular rotation of lamp bulb unit 14 in its bracket 28 is primarily intended to provide sufficient axial distance to permit the electrodes 20 and 21 of FIG. 2 to be slidably removed from socket 22 without the lamp bulb glass tube striking the interior surface of reflector 13. This concept is more clearly shown in FIG. 1. In FIG. 1, end 39 of lamp bulb 16, when in its correct transverse position, as shown by the solid lines thereof, is spaced from dome reflector 13 by a distance denoted A in FIG. 1. After the 30 degree rotation to the position shown in phantom lines in FIG. 1, end 39 is spaced a much greater distance B. Distance B is greater than the length of the electrical terminals 20 and 21 of FIG. 2 which must slide axially from socket 22, and accordingly, lamp bulb 16 in phantom in FIG. 1 may not only be withdrawn from its socket in bracket 28 without striking reflector 13, but also a replacement lamp may be inserted in the socket in bracket 28 without interference from dome reflector 13. As the replacement lamp is rotated to its correct transverse position, crook 37 of spring 35 is biased into aperture 34 of bracket 28 which will provide the relamping person with both an audible and touch signal that the lamp bulb 16 is in its correct position. The releasable securing means of the crook 37 in aperture 34 provides a positive latch for lamp bulb 16 while at the same time permitting a controlled self release upon rotation of lamp bulb 16, and controlled motion thereafter. Spring arm 35 with its crook 37 in aperture 37 of base provides a light but adequate latch and frictional deterrent as a limitation to the swiveling pivot. Pivoting action of lamp bulb unit 14 is effectively limited to one direction only to prevent damage to the lamp bulb unit 14 counterclockwise is prevented by stop means in the form of edge 38 of bracket 28 contacting housing 23. Rotation of lamp bulb unit 14 clockwise moves an end 39 towards open end 15 of reflector 13 for relamping. Electrical power from a source (not shown) is conducted to fixture 10 by the usual electrical conductors or wires 40 which pass through a side of hollow cylinder 23 and connect to socket 22 in cage 28. The ordinary flexibility of a slight excess wire length within housing 23 permits lamp unit 14 to be rotated about pivots 30 and 31 without undue limitation from the electrical conductor wire. Alternatively a common junction box may be associated with fixture 10 so that electrical wires are first connected to the junction box and other wires pass from the junction box to socket 22.

While the present invention has been described with respect to particular embodiments thereof, it will be understood that numerous modifications thereof may be made by those skilled in the art without departing from the spirit and scope of the invention as set forth in the appended claims.

What is claimed is:

1. A lighting fixture particularly adaptable for ease in relamping comprising in combination:
   (a) a hollow open end dome reflector in said fixture;
   (b) said dome reflector having a transverse aperture therein;
   (c) a housing member associated with said dome reflector and covering said transverse aperture;
   (d) a bracket member in said housing with pivotal connections attaching said bracket to said housing such that said bracket member is angularly rotatable about said connections;
   (e) at least one elongated lamp bulb unit retained in said bracket member to extend transversely into said dome reflector through said transverse aperture to be angularly rotatable about said pivotal connections of said bracket member to said housing so that an end part of said lamp bulb unit rotates towards the open end of said dome reflector for manual relamping purposes; and
   (f) releasably securing latch means in said housing and capable of engaging said bracket member to latch said bracket and releasably secure said lamp bulb unit in an optimum light reflecting position in said dome reflector, said latch means being releasable to allow manual rotation of said lamp bulb unit retained in said bracket member for relamping purposes.

2. The invention as recited in claim 1 wherein said elongated lamp bulb is a fluorescent lamp bulb.

3. The invention as recited in claim 1 wherein said releasably securing latching means includes a spring member attached to said housing member and biasingly engaging said bracket member.

4. The invention as recited in claim 1 wherein said transverse aperture in said dome reflector is adjacent the vertex of said reflector.

5. The invention as recited in claim 1 wherein said lamp unit may be angularly rotated in one direction only.

6. The invention as recited in claim 1 wherein stop means are operative to prevent angular motion of the lamp unit in an opposite direction.

7. The invention as recited in claim 1 wherein said angular rotation is about 30 degrees.

8. A lighting fixture particularly adapted for ease in relamping comprising in combination
   (a) a hollow open ended dome reflector member having a transverse opening in the wall thereof adjacent the dome vertex;
   (b) an open end housing member in association with said reflector with its open end surrounding said transverse aperture in open communication therewith;
   (c) a bracket member positioned in said housing member with a free swiveling pivot connection thereto so that said bracket member may angularly pivot about said pivotal connection within said hollow housing member;
   (d) a narrow elongated lamp bulb unit fixed in said bracket member and projecting therefrom transversely into said dome reflector through said transverse aperture;
   (e) said lamp bulb comprising:
      (1) a narrow elongated lamp bulb;

(2) a base member to which said lamp is affixed;
(3) a socket member adapted to receive and engage said base member and adapted to be fixedly inserted in said bracket member; and (f) a spring member attached to said housing and biasingly engaging said bracket member to limit said free swiveling pivot connection.

9. The invention as recited in claim 8 wherein said spring member includes a crook at one end thereof which extends adjacent said bracket member to engage a surface thereof in sliding relationship.

10. The invention as recited in claim 9 wherein said crook projects into an aperture in said surface.

* * * * *